United States Patent
Long et al.

(10) Patent No.: US 7,881,403 B2
(45) Date of Patent: Feb. 1, 2011

(54) SYSTEM FOR REALIZING EMERGENCY RATE ADJUSTMENT

(75) Inventors: Guozho Long, Fremont, CA (US); Jun Zhou, Shenzhen (CN); Jianhua Liu, Shenzhen (CN)

(73) Assignee: Futurewei Technologies, Inc., Plano, TX (US)

( * ) Notice: Subject to any disclaimer, the term of this patent is extended or adjusted under 35 U.S.C. 154(b) by 705 days.

(21) Appl. No.: 11/864,015

(22) Filed: Sep. 28, 2007

(65) Prior Publication Data

US 2008/0084950 A1     Apr. 10, 2008

Related U.S. Application Data

(60) Provisional application No. 60/828,796, filed on Oct. 10, 2006, provisional application No. 60/869,506, filed on Dec. 11, 2006.

(51) Int. Cl.
*H04L 25/49* (2006.01)

(52) U.S. Cl. .................... 375/296; 455/73; 375/295; 375/316

(58) Field of Classification Search ............... 375/346; 455/296
See application file for complete search history.

(56) References Cited

U.S. PATENT DOCUMENTS

| | | | | |
|---|---|---|---|---|
| 6,064,692 A * | 5/2000 | Chow | | 375/219 |
| 6,370,156 B2 * | 4/2002 | Spruyt et al. | | 370/480 |
| 6,567,473 B1 | 5/2003 | Tzannes | | |
| 6,865,232 B1 * | 3/2005 | Isaksson et al. | | 375/260 |
| 7,151,779 B2 * | 12/2006 | Park | | 370/437 |
| 7,216,268 B2 * | 5/2007 | Ryckebusch et al. | | 714/712 |
| 7,519,109 B2 * | 4/2009 | Del Toso et al. | | 375/222 |
| 7,653,843 B2 * | 1/2010 | Ryckebusch et al. | | 714/712 |
| 7,720,167 B2 * | 5/2010 | Stopler | | 375/264 |

(Continued)

FOREIGN PATENT DOCUMENTS

| | | |
|---|---|---|
| CN | 1716989 A | 1/2006 |
| EP | 1672815 A1 | 6/2006 |
| KR | 20010050458 A | 6/2001 |
| WO | 2006044533 A1 | 4/2006 |

OTHER PUBLICATIONS

International Telecommunication Union (ITU), Telecommunication Standardization Sector, COM 15—C 454—E, Study Group 15—Contributions 454, "G.VDSL, Ploam: Modifications in G.993.2 and G.997.1 for SOS functionality," May 2007, pp. 1-14, Ministry of Information Industry of the P. R. China, Huawei Technologies Co., Ltd.

(Continued)

*Primary Examiner*—Chieh M Fan
*Assistant Examiner*—Santiago Garcia
(74) *Attorney, Agent, or Firm*—Conley Rose, P.C.; Grant Rodolph

(57) ABSTRACT

A system for realizing emergency rate reduction (SOS). A receiver initiates a short rate-reduction request, and communicates that request to a transmitter. The transmitter initiates an operational switch to an adjusted transmission reference (i.e., a new bit/gain table), by sending a signal to synchronize the operational switch for both the transmitter and the receiver. The adjusted transmission reference may be calculated using a formula, from a current bit/gain table, or may be a predefined bit/gain table. The parameters of the formula may be predefined, calculated during initialization, or determined in real time during SOS.

26 Claims, 3 Drawing Sheets

U.S. PATENT DOCUMENTS

| | | | | |
|---|---|---|---|---|
| 2004/0233979 | A1* | 11/2004 | Fisher et al. | 375/222 |
| 2005/0063482 | A1 | 3/2005 | Tzannes | |
| 2006/0078044 | A1* | 4/2006 | Norrell et al. | 375/222 |
| 2006/0114976 | A1* | 6/2006 | Langberg et al. | 375/222 |
| 2006/0168073 | A1* | 7/2006 | Kogan et al. | 709/206 |
| 2007/0036177 | A1* | 2/2007 | Isnardi et al. | 370/490 |
| 2007/0280339 | A1* | 12/2007 | Oksman | 375/222 |
| 2008/0253401 | A1* | 10/2008 | Thyagarajan et al. | 370/485 |
| 2008/0273604 | A1* | 11/2008 | Shi | 375/257 |
| 2008/0298444 | A1* | 12/2008 | Cioffi et al. | 375/222 |
| 2009/0022214 | A1 | 1/2009 | Locke | |
| 2009/0041103 | A1* | 2/2009 | Shi | 375/222 |

OTHER PUBLICATIONS

International Telecommunication Union (ITU), Telecommunication Standardization Sector, COM 15—C 456—E, Study Group 15—Contributions 456, "G.VDSL: Further information for the SOS proposal," May 2007, pp. 1-6., Ministry of Information Industry of the P. R. China, Huawei Technologies Co., Ltd.

PCT International Search Report; PCT/CN2007/070863; Jan. 24, 2008; 3 pgs.

PCT Written Opinion of the International Searching Authority; PCT/CN2007/070863; 3 pgs.

Foreign communication from a counterpart application—Australian application 2007306838, office action dated Dec. 17, 2009, 4 pages.

Foreign communication from a counterpart application—European application 07817054.5, dated Apr. 8, 2009, 4 pages.

Foreign Communication From a Related Counterpart Application—Supplementary European Search Report, EP 07817054.5-2411, Mar. 3, 2009, 3 pages.

* cited by examiner

US 7,881,403 B2

SYSTEM FOR REALIZING EMERGENCY RATE ADJUSTMENT

PRIORITY CLAIM

This application claims the priority benefit of U.S. Provisional Application No. 60/828,796, filed Oct. 10, 2006, and U.S. Provisional Application No. 60/869,506, filed Dec. 11, 2006.

TECHNICAL FIELD OF THE INVENTION

The present invention relates generally to Digital Subscriber Line (DSL) technologies, and more particularly, to a versatile system for emergency rate reduction (SOS) in a DSL system.

BACKGROUND OF THE INVENTION

Digital subscriber line (DSL) technologies utilize existing telephone subscriber lines to provide high bandwidth digital communications to end users. Diagram 100 of FIG. 1 provides an illustration of general system. Certain varieties of DSL technology—in particular, asymmetric DSL (ADSL) or Very high rate DSL (VDSL)—are capable of adapting transmission parameters based on channel conditions and end-user demands. ADSL or VDSL technologies utilize a discrete multitone (DMT) line code—one that assigns a number of bits to each tone (or sub-carrier), individually. DMT code may then be adjusted to channel conditions; by determining the number of bits assigned to each tone during training and initialization of modems at each end of a subscriber line.

VDSL2 (ITU-T G.993.2) is an advanced DSL technology that is usually deployed in shorter loops, and uses wider frequency bandwidth when compared with ADSL. Correspondingly, VDSL2 generates a greater degree of crosstalk interference in a line's cable bundle. VDSL2 transceivers on adjacent lines may be seriously affected—especially by far-end crosstalk (FEXT), since such FEXT emanates within those receivers' frequency bands. This is illustrated in reference to diagram 200 of FIG. 2. When an adjacent pair of transceivers starts initialization, an initial pair already in operation suffers from a suddenly increased crosstalk level. VDSL2 crosstalk occurs in a wideband environment. As such, crosstalk is higher at higher frequencies; and crosstalk in VDSL2 is often worse than that in, for example, ADSL. Correspondingly, increments of interference may be much greater than noise margins—causing unacceptable noise margins and bursts of CRC errors that force modems to retrain, which leads to disruptions of service. Such issues are commonly identified in laboratory test and field trials.

In a conventional system, data signals transmitted over twisted-pair phone lines may be significantly degraded by crosstalk interference that is generated on one or more adjacent twisted-pair phone lines in the same (or an adjacent) cable bundle. Correspondingly, suddenly increased crosstalk or other interferences—arising from using twisted-pair phone lines for high data transmission rate technologies (i.e., ADSL or VDSL)—may substantially inhibit proper transmission of data signals.

Therefore, there is a need to provide a system that effectively and efficiently removes or reduces crosstalk interference effects in the operation of high data transmission rate technologies, on an immediate and real-time basis.

SUMMARY OF THE INVENTION

The present invention provides a system, comprising various methods and apparatus, for mitigating the effects crosstalk noise—especially sudden increases in such noise—due to, for example, initialization of VDSL2 modems in adjacent pairs. The present invention introduces an emergency rate adjustment system (SOS) that provides for immediate and real-time adjustment of operational data rates to mitigate crosstalk noise. The SOS provides simple request and response—or synchronous message or signal—mechanisms, over which few, if any, parameters are exchanged.

When crosstalk noise in a DSL system increases suddenly, a burst of CRC errors may occur in a receiver within the DSL system—causing the DSL modems to reset or retrain. The SOS of the present invention maintains modem connections without a reset/retrain, and thus avoids interruption of end-user services. A receiver initiates an SOS operation request to a transmitter at the other end and, upon receiving this request, the transmitter initiates a switch to a known adjustment transmission reference. For example, the receiver may initiate a switch to a pre-determined bit/gain table. The transmitter sends a synchronous signal to synchronize switching between the transmitter and the receiver. In other embodiments, a new adjustment bit/gain table may be produced during initialization, and stored in both transmitter and receiver—thus requiring no exchange of a bit/gain table during SOS. The new adjustment transmission reference (e.g., bit/gain table) provides information necessary to adjust transmission performance to a level that ensures a stable communication link (e.g., VDSL2 link); providing enough margin to successfully operate even in worst-case crosstalk noise. The SOS minimizes or eliminates crosstalk-related CRC errors to such an extent that the transmission link may be maintained, at an adjusted lower—even if sub-optimal—data rate.

The system of the present invention provides processes and constructs for producing an SOS adjustment transmission reference (e.g., bit/gain table). The system of the present invention comprehends and may accommodate various system requirements—such as minimum data rate. The system of the present invention does all of this in a simple and elegant manner; requiring minimal—or even no—data exchange during SOS operation. The present invention provides reliable communication for SOS information; as well as measures to maintain certain performance parameters (e.g., delay, INP) at approximately equal levels before and after SOS.

The present invention thus provides a system for realizing emergency rate reduction (SOS). A receiver initiates a rate reduction request, and communicates the request to a transmitter at the other end. The transmitter initiates an operational switch to an adjusted transmission reference (i.e., a new bit/gain table), and sends a synchronous signal to synchronize the operation switch for both the transmitter and the receiver. The adjusted transmission reference may be calculated using a formula—predefined or determined in real time—from a current bit/gain table, or may be a predefined bit/gain table.

The following description and drawings set forth in detail a number of illustrative embodiments of the invention. These embodiments are indicative of but a few of the various ways in which the present invention may be utilized.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

Figure 1:
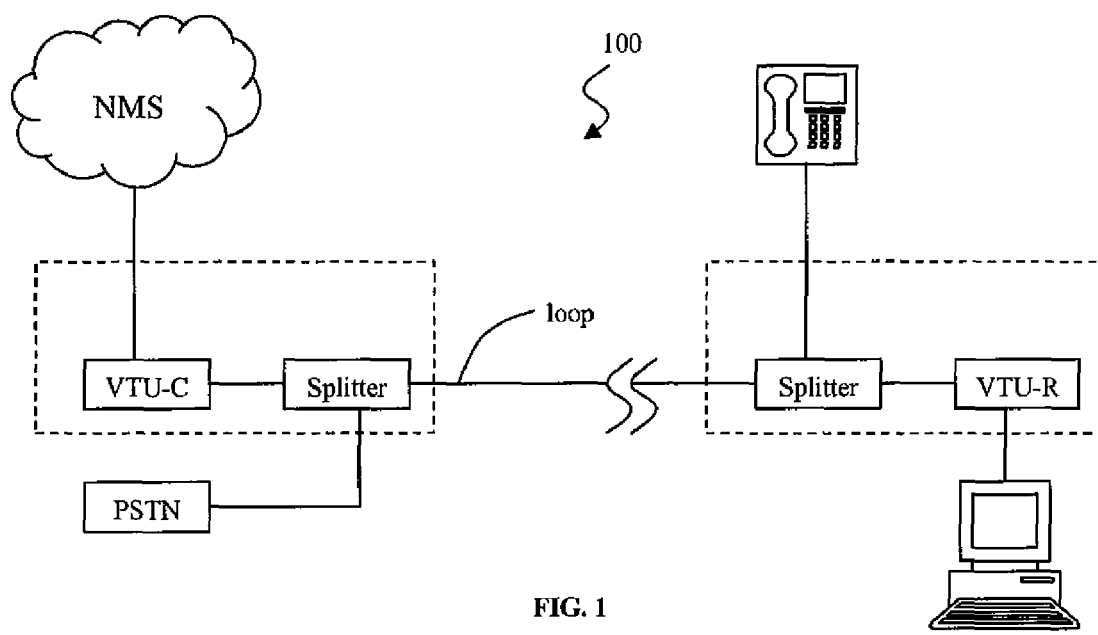
FIG. 1 is a diagram depicting an illustrative DSL-based communications system.
Figure 2:
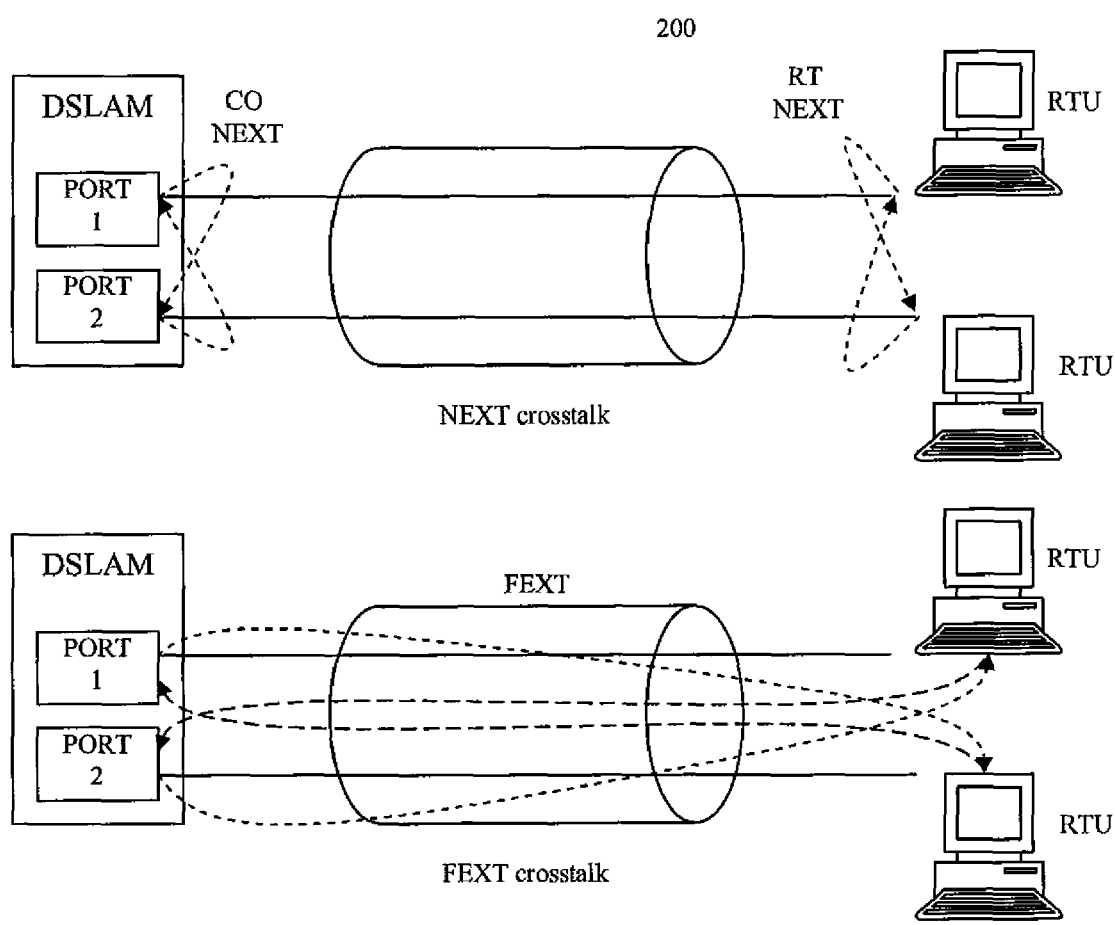
FIG. 2 is a diagram illustrating Near End Crosstalk (NEXT) and a Far End Crosstalk (FEXT)

The following discussion is presented to enable a person skilled in the art to make and use the invention. The general principles described herein may be applied to embodiments and applications other than those detailed below without departing from the spirit and scope of the present invention as defined herein. The present invention is not intended to be limited to the embodiments shown, but is to be accorded the widest scope consistent with the principles and features disclosed herein.

The present invention provides a system for mitigating the effects of sudden noise increase—especially sudden increases in crosstalk noise—due to, for example, initialization of VDSL2 modems in adjacent pairs. The present invention introduces an emergency rate adjustment (SOS) system that provides simple request and response—or synchronous message or signal—mechanisms, over which few, if any, parameters are exchanged.

When crosstalk noise in a DSL system increases suddenly, a burst of CRC errors may occur in a receiver—causing modems to reset or retrain. The SOS of the present invention maintains modem connections without a reset/retrain, and thus avoids interruption of end-user services. A receiver initiates an SOS operation request to a transmitter at the other end and, upon receiving this request, the transmitter initiates a switch to a known adjustment transmission reference. For example, the transmitter may initiate a switch to a pre-determined bit/gain table. The transmitter sends a synchronous signal to synchronize switching between the transmitter and the receiver. In other embodiments, a new adjustment bit/gain table may be produced during initialization, and stored in both transmitter and receiver—thus requiring no exchange of a bit/gain table during SOS. In yet another embodiment, an appropriate coarse adjustment of the bit/gain table may be determined by the receiver in the real time, and communicated to the remote transmitter with a short reliable message. A new adjustment transmission reference (e.g., bit/gain table) provides information necessary to adjust transmission performance to a level that ensures a stable communication link (e.g., VDSL2 link); providing enough margin to successfully operate even in worst-case crosstalk noise. The SOS system minimizes or eliminates crosstalk-related CRC errors to such an extent that the transmission link may be maintained, even if at an adjusted lower (and possibly sub-optimal) data rate.

The system of the present invention provides processes and constructs for producing an SOS adjustment transmission reference (e.g., bit/gain table). The system of the present invention comprehends and may accommodate various system requirements—such as minimum data rate. The system of the present invention does all of this in a simple and elegant manner; requiring minimal—or even no—data exchange during SOS operation. The present invention provides reliable communication for SOS information; as well as measures to maintain certain performance parameters (e.g., delay, INP) at appropriate levels after SOS.

In the G993.2 standard, On-line reconfiguration (OLR) allows changes to PMD without interruption of service and without errors. Types of OLR include bit swapping, and seamless rate adaptation (SRA). Bit swapping reallocates bits and power among allowed sub-carriers, without modification of total data rate or higher layer features of the physical layer. In ADSL and VDSL2, a bit/gain table contains information of number of bits per tone, and corresponding gain values. For each tone, two bytes are used: 4 bits for the number of bits carried by each tone, and 12 bits for the corresponding gain of the tone.

Bit swapping reconfigures the bit and gain ($b_i$, $g_i$) parameters, without changing total data rate or any other PMD or PMS-TC control parameters. In the G.993.2 standard, a bit swapping protocol is provided. More specifically, when a particular receiver determines that a bit swap is needed, it sends a bit swap request over an overhead channel (typically referred to as the EOC-VDSL overhead channel). A bit swap acknowledge command specifies a specific symbol count on which a corresponding swap will be implemented. The acknowledge command is used to simplify detection of the implementation of a new bit distribution. The acknowledgement, however, slows down swapping speed, and may cause failure if the acknowledgement is not received. Bit swap can only move some data bits, from a limited number of deteriorated tones to other tones with extra SNR margin, while keeping total data rate unchanged. Bit swap is not, however, adequate to compensate for sudden increase of noise at many tones.

The mechanism of SRA—as defined in ADSL and VDSL2—is such that a receiver monitors real time noise margin, and compares it with predefined upshift and downshift noise margins. If a real time noise margin exceeds a range of downshift and upshift noise margin for a time period, exceeding some predefined time interval, the receiver determines an adjustment transmission reference (i.e., a new bit/gain table) and requests an SRA operation via an EOC message to the transmitter. Upon receiving the SRA request, and the new bit/gain table, the transmitter sends an SRA synchronous signal—indicating the switching of the bit/gain table—to the receiver, and both sides switches to the new bit/gain table synchronously.

VDSL2 uses up to 4 k tones. If the bit/gain table needs to be adjusted for each bin, the information to be exchanged during SRA can exceed 8K bytes—which can take quite a long time to go through EOC message channels. SRA for ADSL and VDSL2 also limits the number of bins with changed bit/gain to 128. To change all 4 k tones, SRA has to be executed 32 times. When a sudden increase of a crosstalk, generated by adjacent devices (e.g., modem pairs), increases noise level much higher than the noise margin, bit error rate can increase dramatically and render communication links unreliable. Due to the manner in which an overhead channel is multiplexed into a transmission frame, reliability and error rates of the overhead channel are essentially the same as that of data transmission. Therefore, the EOC channel (as part of the communication links) also becomes unreliable. A high bit error rate severely impacts SRA and causes it to fail, due to errors during exchange of the new bit/gain table, and request/acknowledgement through the EOC channel. When the noise level increases significantly, loss of margin results in high error rates on the overhead channel. It thus becomes very difficult, if not impossible, to pass messages when SNR margin becomes negative.

In contrast, the present invention discloses an emergency rate adjustment (SOS) system that sustains service and avoids service disruptions due to retraining. A receiver may initiate a request for switching to a non-disruptive, lower bit-rate configuration known to both sides in the event of a sudden and sustained increase in noise such as crosstalk. In certain embodiments of the present invention, transceivers on both sides may store multiple bit/gain tables; one for normal operation and the other(s) for SOS operation.

During initialization, a receiver may produce multiple (e.g., two) bit/gain tables: one based on current channel parameters for normal usage; and other table(s) for an adjusted performance level (e.g., more conservative as compared to the first table). The adjusted performance table may be produced based on current channel parameters, in addition to some predefined rule(s) (e.g., predefined virtual noise). The rule(s) provide for an adjusted performance table, and corresponding link, having sufficient noise margin for operation even in worst case conditions (e.g., all adjacent transceiver pairs in a bundle start initialization). During an exchange phase of initialization, the bit/gain tables are exchanged between receiver and transmitter, and stored in both. The adjusted performance table(s) may be updated later.

In other embodiments, both sides (receiver and transmitter) store a formula or process for calculating new bit/gain tables from a current bit/gain table. The formula may be predefined in CO-MIB, and exchanged during initialization, to then be stored in both CO and CPE. The formula may also be calculated during initialization by a receiver, and then communicated to a transmitter. When the receiver initiates an SOS operation, both transmitter and receiver calculate a new bit/gain table from this predefined formula; and then switch to operation using the new table synchronously. Both sides use the same formula, rendering the new tables in both sides identical.

If a predefined formula is utilized, VTU-O and VTU-R may use the formula to generate an adjustment bit/gain table, and switch to operation with it. The parameters of the formula may be predefined by an operator, or during initialization, or decided at the time of an SOS operation. Several illustrative embodiments of such are described below. Because actual crosstalk may not be flat, and actual crosstalk effects are highly dependent on frequency, a flat rate adjustment (i.e., reduction) may be too conservative in some applications—causing a disproportionate bit rate reduction.

In order to better match actual crosstalk characteristics, one or more (multiple) frequency break points may be defined. Each break point comprises a starting frequency of the frequency band, within which the same bit reduction value (br) is applied to all used bins. Different br values may be defined for different frequency bands to better address crosstalk spectrum in the bundle. Specifically, at the $n^{th}$ break point, $(f_n, br_n)$ may be defined—wherein $f_n$ is the starting bin index, and $br_n$ is the bit reduction for bin $(f_n)$ to $(f_{n+1}-1)$. The break points may be determined by types of services (e.g., ADSL, ADSL2+, or VDSL2) provided in a given line (i.e., cable). From PSD defined in standards for those services, an operator may determine a likely crosstalk spectrum. Typically, crosstalk on DSL may have band edges at 138 KH, 276 KHz, 552K, 104 MHz, 2.208 MHz; or in the case of VDSL2, and number of band edges. Break points may also be determined by, for example: channel noise measurement history; transceivers during the Channel Analysis & Exchange phase of Initialization; or operator experience and measurement history of the line.

The value $br_n$ may be determined by crosstalk (near end crosstalk—NEXT, and far end crosstalk—FEXT) as calculated for the data rate setting of the line, and the types of DSL services and number of pairs provided in a given line. The value $br_n$ may be determined by bit loading numbers of a band, if $br_n$ is determined during the Channel Analysis & Exchange phase of Initialization. The value $br_n$ may be determined by operator experience and/or measurement history of the line, or any other proper ways.

The values of function $(f_n, br_n)$ may be exchanged through MIB in the handshake (e.g., as determined by operator experience, or calculated by crosstalk module), or during Initialization procedure(s). If there are two or more $(f_n, br_n)$—for example, $(f_n, br_n)$ exchanged in MIB, and another $(f_n, br_n)$ generated during Initialization procedure—the final $(f_n, br_n)$ may be generated in a manner similar to, for example, the generation of transmit PSDMASK. The values of function $(f_n, br_n)$ may be exchanged between CO and CPE in handshake phase, or during an Initialization procedure. The values of function $(f_n, br_n)$ may be exchanged between CO and CPE in Channel Analysis & Exchange phase, or another phase during the initialization procedure. These values may be updated at a later time (e.g., during "Showtime").

If there is no minimum date rate limit when SOS initiates, certain embodiments may employ a pre-defined $b_i$ reduction value br of each band ($br_n$), to generate a new bit/gain table—using, for example, a process of the form: for each tone index i, compute new $b_i$ value as $b_i'=b_i-br$; if $b_i'<2$ then $b_i'=0$, else $b_i'=b_i'$; and all $g_i$ values are unchanged. Operators typically set minimum data rate requirements; levels below which minimum service may not be provided, rendering the connection useless. If a predefined minimum data rate has to be kept when SOS is initiated, minimum data rate needs to be taken into consideration when generating a new bit/gain table. If minimum data rate is taken into consideration, and predefined br values are applied (based on process above) to generate a new bit/gain table, minimum data rate requirements may still not be satisfied due to on-line Reconfiguration (OLR) of DSL (e.g., seamless rate adaptation (SRA)) and bit swap (BS).

If the SOS rate calculated—based on predefined br values and bitloading at the time of SOS activation—is lower than a minimum rate threshold, certain embodiments of the present invention may be implemented to decrease br values. In certain embodiments, for example, one br value at a time may be decreased, followed by calculation of the rate. If the rate is still too low, the next br may be decreased. For example, decrease $br_1$, first, then $br_2$, etc., until the last br; and then return to $br_1$ and repeat, if necessary, until the rate is not below, and close to, the threshold. Some of these adjustment process embodiments may provide even finer granularity by applying a decreased br value, bin by bin within the group, until the threshold requirement is satisfied. Some embodiments may, for example, apply a decreased br from a first bin (or a last bin) and repeat, bin by bin, until the threshold is satisfied. In these adjustment process embodiments, granularity is down to a single bit.

If the SOS rate calculated—based on predefined br values and bitloading at the time of SOS activation—is much higher than a minimum rate threshold, and the SOS rate needs to be kept close to the threshold for better robustness, certain embodiments may increase br values, for example, one br value at a time, and calculating rate. If the rate is still too high, the next br is increased. For example, increase $br_1$ first, then $br_2$, etc., until the last br and then return to $br_1$, and repeat, if necessary, until the rate is close to the minimum threshold. If reducing bitloading at higher frequencies is preferred, the order of the process above may be reversed. Namely, increase br starting from the highest group to lower groups. Granularity is reduced by not increasing all br values together. For even finer granularity, some of these adjustment process embodiments may apply the increased br value, bin by bin, within the group until the threshold is satisfied. Some embodiments may, for example, apply an increased br from the first bin (or the last bin) and repeat, bin by bin, until the threshold is satisfied. In these adjustment process embodiments, granularity is down to a single bit.

A br value may be determined in real time by a receiver, and communicated to a transmitter. In certain embodiments, br values may be adapted—based upon line conditions—when SOS is initiated. Instead of using pre-defined br values, a receiver computes br values, based on a quick estimate of channel conditions at that time, and communicates those br values to a transmitter via a robust message protocol. Minimum data rate may also be maintained by, for example, a process similar to the second process described above—performed, for example, by the receiver when it computes br values.

Figure 3:
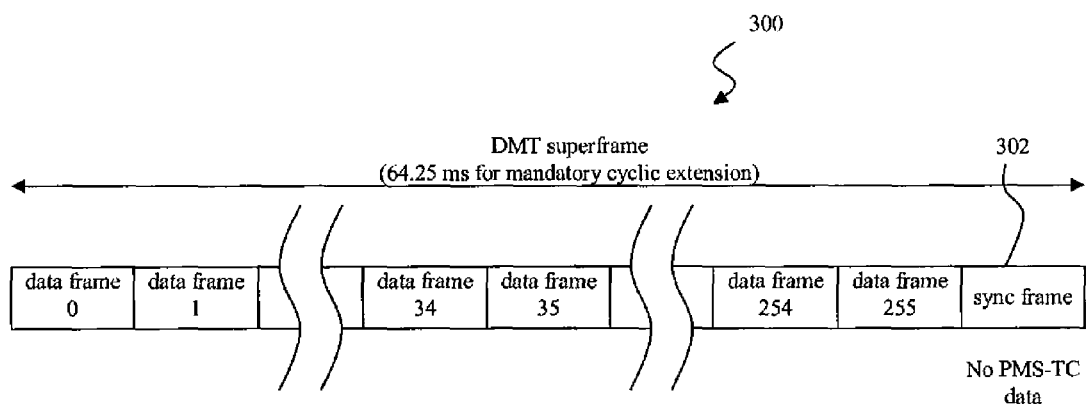
FIG. 3 is a diagram depicting a DMT frame structure in accordance with certain embodiments of the present invention.

To trigger and possibly transmit a few messages, a reliable communication link is essential. Because noise margin at the time of SOS initiation is typically negative, regular communication links may be unreliable. For a robust message protocol, an EOC channel may be used to transmit a message carrying br information. Using repeating, PN, or other orthogonal sequences to encode this EOC message may enhance robustness and ensure that the message can be received correctly. Also a robust channel dedicated to transmitting SOS information may be defined. Referring now to frame structure 300 of FIG. 3, other embodiments may provide a sync frame 302 to transfer SOS information. In order to communicate SOS information more reliably (with negative noise margin), coding schemes may be provided in the sync frame.

Certain embodiments of such coding schemes may take the following form(s). In a sync frame 302, a 4-QAM signal may be transmitted at each bin—with the 4-QAM signal at each bin being selected by 2 bits from a PN sequence. Because 2m bits of SOS information is transmitted, a first m bins—with each bin carrying 2 bits—may be used to transmit a total of 2m bits. The value of m is very small, because only a very limited amount of SOS information needs to be transmitted.

At each bin, 2 bits of SOS information is combined (i.e., exclusive-OR) with 2 bits from a regular PN sequence, to select one of four QAM signals. VDSL2 may use numerous bins. After the first m bins, the same 2m bits are applied to the next m bins, and so on, until all bins are used. 2m bits may be applied to each group of m bins by simply repeating, or by some form of coding. For example, if 8 bits are to be transmitted, 4 bins are needed to transmit them. If VDSL uses 2048 bins, those 8 bits are transmitted 512 times—as either repeated or coded bits. This may provide approximately 27 dB SNR improvement—rendering communication much more reliable. Since crosstalk tends to be less severe at lower frequencies, signals at lower bins are usually more reliable for a receiver. When combining signals in multiple groups, a receiver may assign greater weight to lower bins for even more reliable detection.

In order to ensure a link surviving suddenly increased wideband noise, such as crosstalk, an adjustment bit/gain table comprehends target noise margin and BER, even for worst-case conditions—i.e., all other adjacent transceiver pairs on the same line initialize while the primary pair is operating. If there is a minimum data rate threshold during such an SOS condition, the adjustment bit/gain table—or the adjustment process—must take that threshold into consideration. The link rate of an adjustment bit/gain table may be low. Nonetheless, the loop may not always be in worst-case condition. SRA may then be implemented after SOS to adapt the rate to an appropriate level, with proper noise margin. When noise decreases, SRA may adaptively increase data rate, and an optimal loop rate may be realized. As such, SRA may have optimal robustness, due to a very low BER provided by the SOS system.

During initialization, an SOS configuration may be determined. In instances where two bit/gain table are utilized, configuration may be defined utilizing pre-defined, dedicated bit/gain tables, separate from those used during normal data mode. Alternatively, they may be defined using a predefined adjustment process (i.e., formula) for deriving actual bit/gain tables. This configuration information must be communicated between two modems during initialization. In embodiments where a formula is used to calculate adjustment bit/gain table(s), only the formula need be exchanged through CO-MIB—requiring significantly less memory than exchanging entire bit/gain tables. Parameters for a formula may be pre-defined, or selected in real-time by a receiver—in which case selected parameters must be communicated to the transmitter.

After SOS is initiated, data rate may be reduced. Reduction in data rate may increase delay at an interleaver, as well as impulse noise protection (INP). If the delay is to be kept approximately constant after SOS, while satisfying INP requirements, an interleaver's depth Dp may be reduced. An illustrative embodiment of such a process is described below:
Compute data rate reduction ratio before and after SOS as DRRR=Lp/Lp'.
  i. The new Dp' is obtained by rounding (Dp/DRRR), up or down. Other interleaver & FEC parameters $I_p$, $R_p$, $N_{FEC}$ and $q_p$ remain unchanged.
Determine if Dp' is co-prime with $I_p$. Because $I_p$ is unchanged, Dp' has to be co-prime with $I_p$.
If Dp' is not co-prime with $I_p$, Dp' is increased by 1 until it becomes co-prime with $I_p$.

With this approach, the ratio of Lp/Dp remains approximately constant. Thus, delay and INP are approximately constant before and after SOS. Because Dp' is calculated using the same formula at both sides (i.e., receiver and transmitter), it does not need to be communicated therebetween.

In instances where changing Dp is optional, such change(s) may be exchanged during handshake. If this feature is not supported, Dp will not be changed. In such instances, with reduced Lp, INP and delay may increase. After SOS, data rate is reduced, and has smaller Lp. $INP_{min}$ is not violated during that time.

Change in Lp—based on non-erasure decoding—impacts $INP_p$, as described below. According to current standards, when erasure decoding is not used, $INP_p$ is computed by:

$$INP\_no\_erasure_p = \frac{8 \times D_p \times \left\lfloor \frac{R_p}{2 \times q_p} \right\rfloor}{L_p} \quad (1)$$

$$= \frac{S_p \times D_p \times \left\lfloor \frac{R_p}{2 \times q_p} \right\rfloor}{N_{FECp}} DMT \text{ symbols.}$$

$$\text{If } N_{FEC} = q \times I; \text{ then } q_p = \frac{N_{FEC}}{I}. \quad (2)$$

Combining the two equations above, and substituting $q_o$ with $$\frac{N_{FEC}}{I}$$

in equation (1), $INP_p$ is:

$$INP\_no\_erasure_p = \frac{8 \times D_p \times \left\lfloor \frac{R_p}{2 \times q_p} \right\rfloor}{L_p} \quad (3)$$

$$= \frac{8 \times D_p \times \left\lfloor \frac{F_p}{2 \times \frac{N_{FEC}}{I}} \right\rfloor}{L_p}$$

$$= \frac{8 \times D_p \times \left\lfloor \frac{R_p \times I}{2 \times N_{FEC}} \right\rfloor}{L_p}$$

If interleave and FEC parameters $D_p$, I, $R_p$, $N_{FEC}$ and $q_p$ are stable, then decreasing Lp may cause increasing in INP_no_erasure$_p$. As such, $INP_p$ (after SOS)>$INP_p$ (before SOS)>$INP_{min}$. In this case, there is no problem in meeting the required $INP_{min}$.

A consideration of interleave delay$_p$ is also useful. According to current standards, $INP_p$ may be expressed:

$$delay_p = \frac{S_p \times (D_p - 1)}{q_p \times f_s} \times \left(1 - \frac{q_p}{N_{FECp}}\right) ms; \quad (4)$$

$$\text{where } q_p = \frac{N_{FEC}}{I_p} \text{ and } S_p = \frac{8 \times N_{FECp}}{L_p}. \quad (5)$$

So INP_no_erasure$_p$ may be expressed:

$$delay_p = \frac{S_p \times (D_p - 1)}{q_p \times f_s} \times \left(1 - \frac{q_p}{N_{FECp}}\right) \quad (6)$$

$$= \frac{\frac{8 \times N_{FECp}}{L_p} \times (D_p - 1)}{\frac{N_{FECp}}{I_p} \times f_s} \times \left(1 - \frac{\frac{N_{FECp}}{I_p}}{N_{FECp}}\right)$$

$$= \frac{8 \times I_p \times (D_p - 1)}{L_p \times f_s} \times \left(1 - \frac{1}{I_p}\right)$$

$$= \frac{8 \times I_p \times (D_p - 1)}{L_p \times f_s} \times \left(\frac{I_p - 1}{I_p}\right)$$

$$= \frac{8 \times (D_p - 1) \times (I_p - 1)}{L_p \times f_s}.$$

Thus, if interleaver and FEC parameters such as $D_p$, I, $R_p$, $N_{FEC}$ and $q_p$ remain unchanged, decreasing Lp may cause increased interleave delay$_p$.

Following these illustrative formulas, both INP and delay are directly proportional to Dp, but inversely proportional to Lp. With the present invention, Dp and Lp vary proportional to one another. As a result, the ratio of Dp and Lp remains approximately the same and, thus, INP and delay are approximately the same before and after SOS.

The previous description of the disclosed embodiments is provided to enable those skilled in the art to make or use the present invention. Various modifications to these embodiments will be readily apparent to those skilled in the art and generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. A method of mitigating crosstalk noise effects in a high-bandwidth communication network, the method comprising the steps of:
    providing a transceiver pair operating in the communication network;
    after initialization, detecting a presence of a sudden increased noise level affecting a receiving member of the transceiver pair;
    generating an operation request, from the receiving member to a transmitting member of the transceiver pair, indicating a plurality of bit reduction on values included in a transmission adjustment reference, wherein the transmission adjustment reference is used for adjusting a transmission reference to an adjusted transmission reference, and wherein the transmission adjustment reference defines one or more frequency break points and a corresponding bit reduction value for each frequency break point, each frequency break point indicates a starting frequency of a frequency band, and the corresponding bit reduction value is applied to all used bins within the frequency band;
    generating a trigger signal, from the transmitting member to the receiving member, to initiate a switch to the adjusted transmission reference; and
    synchronizing an operational shift, by both the receiving member and transmitting member, to communication utilizing the adjusted transmission reference.

2. The method of claim 1, wherein the high-bandwidth communication network is based upon ITU-T G.993.2 standards.

3. The method of claim 1, wherein the transmission adjustment reference comprises a predetermined adjustment reference known to both the receiving member and the transmitting member.

4. The method of claim 1, wherein the transmission adjustment reference is produced by the receiving member and communicated to the transmitting member.

5. The method of claim 3, wherein the transmission adjustment reference comprises a predefined formula, for generating a new bit/gain table, stored by both the receiving member and the transmitting member.

6. The method of claim 4, wherein the transmission adjustment reference comprises a predefined formula stored by the receiving member.

7. The method of claim 4, wherein the transmission adjustment reference comprises a formula provided to the receiving member during initialization.

8. The method of claim 1, further comprising implementing a seamless rate adaptation after communication utilizing the adjusted transmission reference.

9. The method of claim 1, wherein the step of generating the operation request further comprises transmitting the operation request via a dedicated transmission channel.

10. A system for mitigating crosstalk noise effects in a digital subscriber line network, comprising:
    a transmitter; and
    a receiver adapted to detect a presence of a sudden increased noise level affecting communication with the transmitter after initialization;
    wherein the receiver is adapted to generate an operation request to the transmitter that indicates a plurality of bit reduction values included in a transmission adjustment reference, wherein the transmission adjustment reference is used for adjusting a transmission reference to an adjusted transmission reference, wherein the transmission adjustment reference defines one or more frequency break points and a corresponding bit reduction value for each frequency break point, each frequency break point indicates a starting frequency of a frequency band, and the corresponding bit reduction value is applied to all used bins within the frequency band;

wherein the transmitter is adapted to send a trigger signal to the receiver, and wherein both the transmitter and the receiver synchronously perform an operational shift to communication utilizing the adjusted transmission reference.

11. The system of claim 10, wherein the digital subscriber line network is based upon ITU-T G.993.2 standards.

12. The system of claim 10, wherein the transmission adjustment reference comprises a predetermined adjustment reference known to both the receiving member and the transmitting member.

13. The system of claim 10, wherein the transmission adjustment reference is produced by the receiving member and communicated to the transmitting member.

14. The system of claim 12, wherein the adjusted transmission reference comprises a predefined bit/gain table stored by both the receiving member and the transmitting member.

15. The system of claim 12, wherein the transmission adjustment reference comprises a predefined formula, for generating a new bit/gain table, stored by both the receiving member and the transmitting member.

16. The system of claim 13, wherein the transmission adjustment reference comprises a predefined formula stored by the receiving member.

17. The system of claim 10, adapted to perform a seamless rate adaptation after communication utilizing the adjusted transmission reference.

18. The system of claim 10, wherein the short-operation request is transmitted via an overhead channel of the digital subscriber line network.

19. The system of claim 10, wherein the operation request is transmitted via a dedicated transmission channel.

20. The method of claim 1, wherein the operation request is transmitted in a robust channel.

21. The method of claim 5, wherein for each tone index i, compute new $b_i$ value as $b_i'=b_i-br$; if $b_i'<2$ then $b_i'=0$, else $b_i'=b_i$.

22. The method of claim 15, wherein for each tone index i, compute new $b_i$ value as $b_i'=b_i-br$; if $b_i'<2$ then $b_i'=0$, else $b_i'=b_i$.

23. The method of claim 1, wherein the transmission adjustment reference further includes groups of bit values of different frequency bands, each group of bit values are used together with a corresponding bit reduction value to calculate new bit values included in the adjusted transmission reference.

24. The method of claim 23, further comprising: calculating the new bit values by both the transmitting member and the receiving member respectively.

25. The method of claim 1, wherein the operation request is transmitted via an overhead channel of the digital subscriber line network.

26. The method of claim 1, wherein different bit reduction value may be defined for different frequency hand.

* * * * *

UNITED STATES PATENT AND TRADEMARK OFFICE
CERTIFICATE OF CORRECTION

PATENT NO.        : 7,881,403 B2
APPLICATION NO.   : 11/864015
DATED             : February 1, 2011
INVENTOR(S)       : Guozhu Long, Jun Zhou and Jianhua Liu Page 1 of 1

It is certified that error appears in the above-identified patent and that said Letters Patent is hereby corrected as shown below:

Title page of the patent correct first name of first inventor to read "Guozhu Long".

Column 10, line 14, should read "indicating a plurality of bit reduction values included"

Column 12, line 15 should read "The system of claim 15, wherein for each tone index i,"

Column 12, line 31 should read "values may be defined for different frequency bands."

Signed and Sealed this
Thirteenth Day of March, 2012

David J. Kappos
*Director of the United States Patent and Trademark Office*